United States Patent [19]

Sakamoto

[11] Patent Number: 4,578,706

[45] Date of Patent: Mar. 25, 1986

[54] TELEVISION SYNCHRONOUS RECEIVER

[75] Inventor: Yoichi Sakamoto, Takatsuki, Japan

[73] Assignee: Matsushita Electric Industrial Co., Ltd., Osaka, Japan

[21] Appl. No.: 550,217

[22] Filed: Nov. 9, 1983

[30] Foreign Application Priority Data

Nov. 12, 1982 [JP] Japan .................................. 57-199185
Dec. 1, 1982 [JP] Japan .................................. 57-211717

[51] Int. Cl.⁴ ........................ H04N 5/50; H04B 11/32
[52] U.S. Cl. ............................. 358/195.1; 358/193.1; 455/164
[58] Field of Search ..................... 358/195.1; 455/164, 455/182, 265; 358/193.1

[56] References Cited

U.S. PATENT DOCUMENTS 4,271,434  6/1981  Sakamoto ........................ 358/193.1
4,461,035  7/1984  Sakamoto ........................... 455/164

Primary Examiner—James J. Groody
Assistant Examiner—Howard L. Carter
Attorney, Agent, or Firm—Wenderoth, Lind & Ponack

[57] ABSTRACT

A synchronous receiver having a reduced pull-in time without requiring a frequency error detection circuit using a differentiator is provided with a voltage-controlled oscillator, a 90° phase shifter which shifts the phase of an output from the voltage controlled oscillator by an angle of 90°, first and second synchronous detectors which detect an in-phase component and a quadrature component of a video carrier signal, a phase detector for detecting a phase difference between the video carrier signal and the output of the voltage-controlled oscillator, a first low pass filter for filtering the output of the phase detector, a frequency discriminator for discriminating the frequency of an audio IF signal generated by the first synchronous detector and a second low pass filter for filtering the output of the frequency discriminator. The output of the first and second low pass filters are fed back to the voltage-controlled oscillator so that the phase difference between the output of the first and second synchronous detectors is made equal to 0.

4 Claims, 8 Drawing Figures

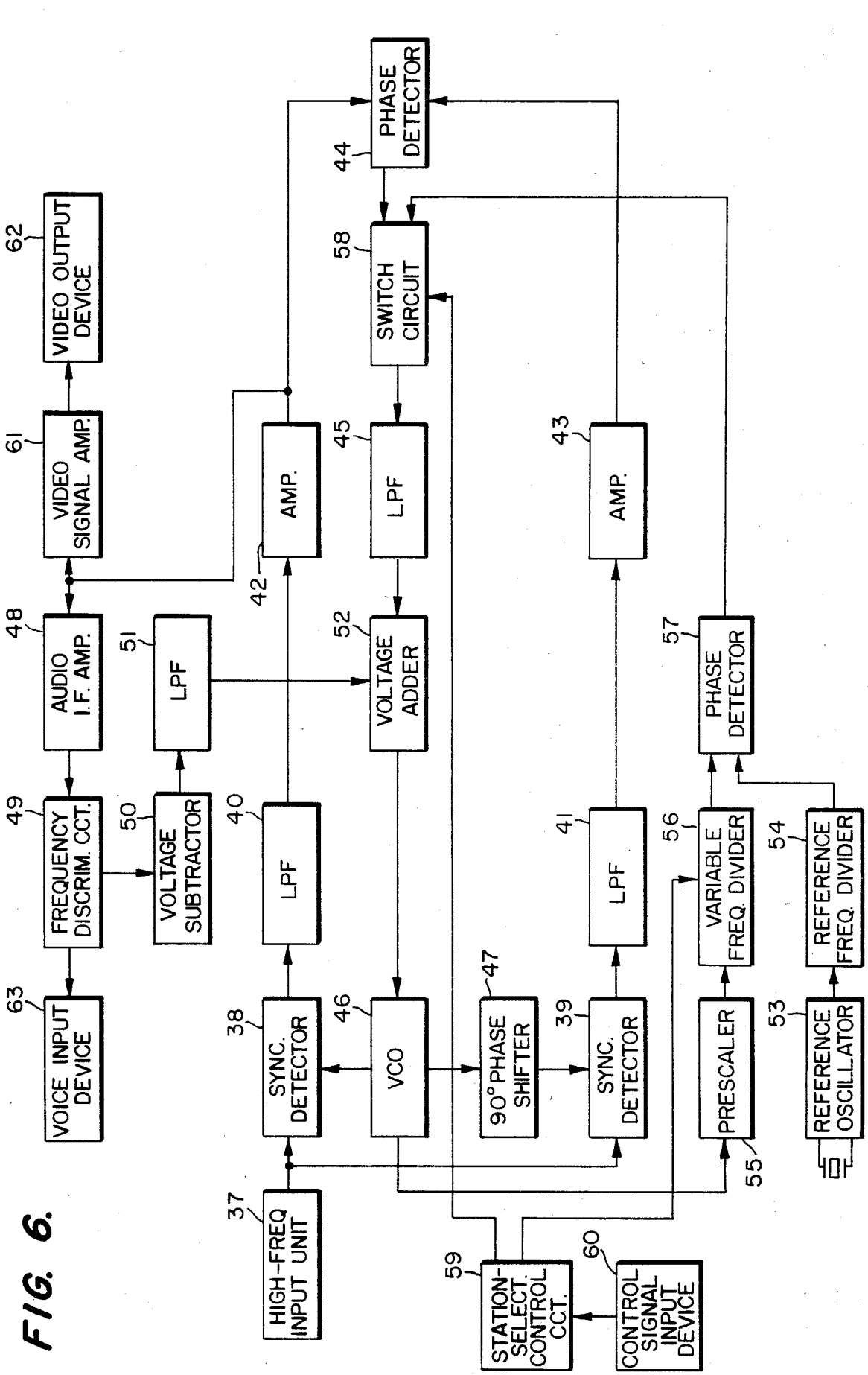

TELEVISION SYNCHRONOUS RECEIVER

BACKGROUND OF THE INVENTION

1. Field of the Invention

This invention relates to a television synchronous receiver usable for a television receiver and a VTR video tuner.

2. Description of Prior Art

Recently, television receivers and VTR video tuners have widely used the so-called electronic tuner which uses a variable-capacitance diode as the tuning element. The electronic tuner is advantageous in that it is of a non-contact type and is therefore free from poor contact problems and is convenient for multifunction uses, such as remote control, because of its electronic control, but there is variation in the characteristics of variable-capacitance diodes and the tuning requires the use of inductances, whereby the manufacturing of such systems is difficult and minimizes automatization.

Hence, it is proposed to use a synchronous receiver which uses no tuning circuits and which is easy to integrate. There are various kinds of synchronous receivers, in which the synchronous carrier recovery method is the most suitable for phase-synchronizing the synchronous carrier with a fine television signal. Such method is called the Costas loop method, but to applying this method to a television receiver, it is necessary to form a frequency pull-in circuit suitable for use in the television receiver.

FIG. 1 is a block diagram of a principal construction of a conventional synchronous receiver, which couples the synchronous carrier recovery method synchronous receiver with a frequency error detection circuit using a differentiator. A Costas loop system synchronous receiver comprises a first synchronous detector for synchronous-detecting the in-phase component of a modulated carrier input, a second synchronous detector 2 for synchronously detecting the quadrature component, low-pass filters 3 and 4 for low-pass filtering the output of each of the two synchronous detectors 1 and 2, a phase detector 5 which voltage-multiplies the outputs of two low-pass filters 3 and 4, a low-pass filter 6 which low-filters the output of phase detector 5, a voltage-controlled oscillator 7 which is controlled by the output of low-pass filter 6, and a phase shifter 8 which shifts the output of voltage-controlled oscillator 7 by an angle of 90° in phase. The frequency error detection circuit comprises a band-pass filter 9 which band-pass-filters the output obtained by low-pass-filtering the output of the first synchronous detector 1, a differentiator 10 which differentiates the output of the band-pass filter 9, a band-pass filter 11 which band-pass-filters the output obtained by low-pass-filtering the output of the second synchronous detector 2, a multiplier 12 which multiplies the output of band-pass filter 11 by the output of differentiator 10, and a low-pass filter 13 which low-pass-filtering the output of voltage multiplier 12, and is coupled to the Costas loop system synchronous receiver at the input of a voltage adder 14.

The Costas loop system synchronous receiver adds a signal to the phase detector 5 comprising in-phase component and a quadrature component obtained from the first and second synchronous detectors 1 and 2 so as to thereby obtain from the phase detector 5 a voltage proportional to a phase error between the modulating carrier of input to the receiver and the output of voltage-controlled oscillator 7, that is, the synchronous carrier, the voltage being fed-back to the voltage-controlled oscillator 7, thereby controlling the phase error so as to be zero. In the frequency error detection circuit, the signal of in-phase component differentiated by the differentiator 10 is voltage-multiplied by the signal of the quadrature component by use of the voltage multiplier 12 so as to thereby obtain a voltage proportional to a frequency error between the modulating carrier and the synchronous carrier, the voltage being superposed by the voltage adder 14 on a voltage proportional to the phase error, thereby reducing the pull-in time of the synchronous receiver.

The conventional example as shown in FIG. 1 has a problem in that the extra frequency error detection circuit must be added and it is difficult to actually constitute the differentiator contained therein.

SUMMARY OF THE INVENTION

An object of the invention is to provide a synchronous receiver capable of reducing its pull-in time without adding a frequency error detection circuit using a differentiator.

In order to attain the above object, the synchronous receiver of the invention is provided with a voltage-controlled oscillator, a 90°-phase shifter which shifts the phase of output from the voltage-controlled oscillator by an angle of 90°, first and second synchronous detectors which detect an in-phase component and a quadrature component of a video carrier signal output from an input unit of the receiver having two synchronous carriers comprising an output of the voltage controlled oscillator and an output of the 90° phase shifter, a phase detector which detects a phase difference between the video carrier signal and the output of the voltage-controlled oscillator from the outputs of first and second synchronous detectors, a first low-pass filter for low-pass filtering the output of the phase detector, a frequency discriminator which discriminates the frequency of an audio intermediate-frequency signal generated by the first synchronous detector, and a second low-pass filter which low-pass filters the output of the frequency discriminator, and is so constructed that the output of the second low-pass filter together with the output of the first low-pass filter which low-pass filters the output of phase detector is fed-back to the voltage-controlled oscillator. Hence, the output frequency of the voltage-controlled oscillator is pulled in the direction of the frequency of video carrier wave and the voltage-controlled oscillator is controlled so that a phase difference between the outputs of first and second synchronous detectors is made equal to zero.

The above and other objects and features of the invention will be apparent from a reading of the following description in accordance with the accompanying drawings.

BRIEF DESCRIPTION OF THE DRAWINGS

FIG. 4-(b) shows the frequency characteristic of a video signal amplifier;

FIG. 5-(b) shows an output characteristic of a voltage subtractor; and

FIG. 6 is a block diagram of a modified embodiment of the invention.

DESCRIPTION OF THE EMBODIMENT

Figure 1:
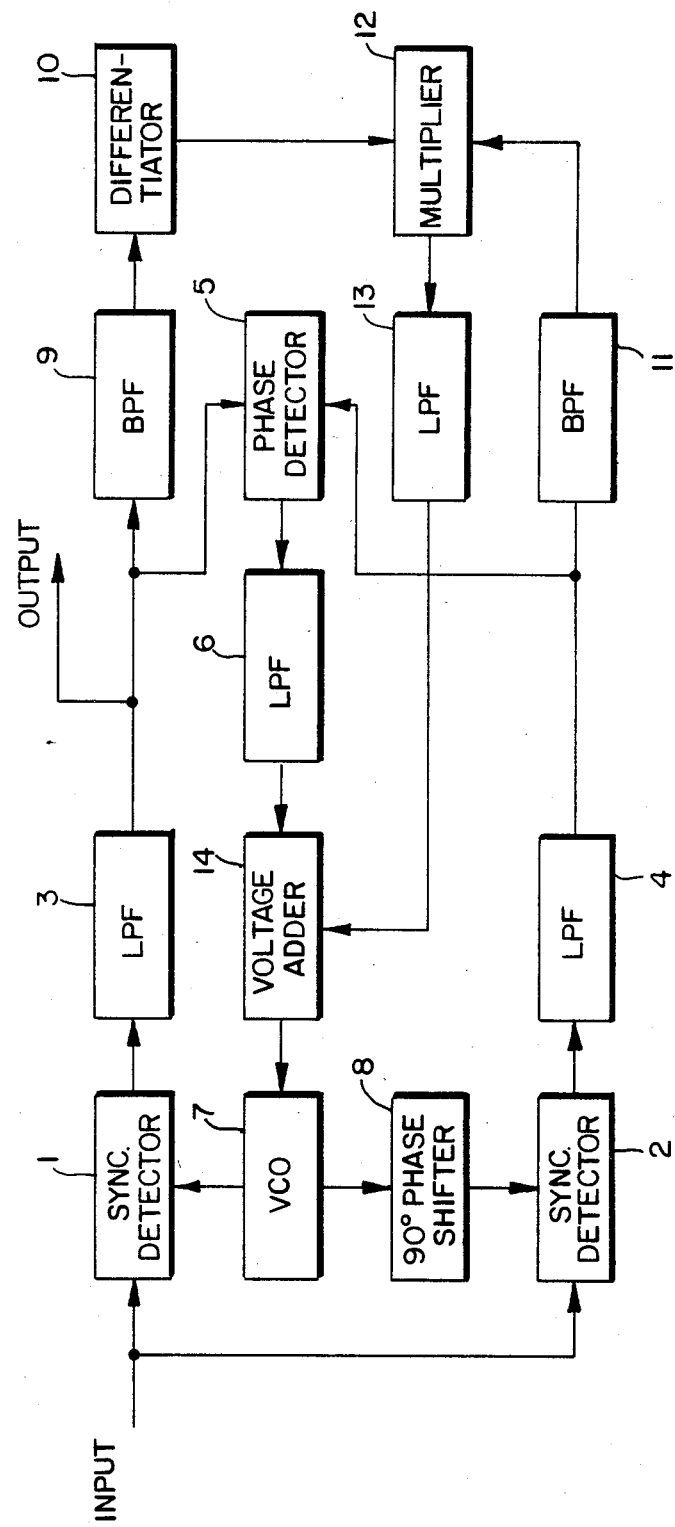
FIG. 1 is a block diagram of the principal portion of a conventional example of a synchronous television receiver.
Figure 2:
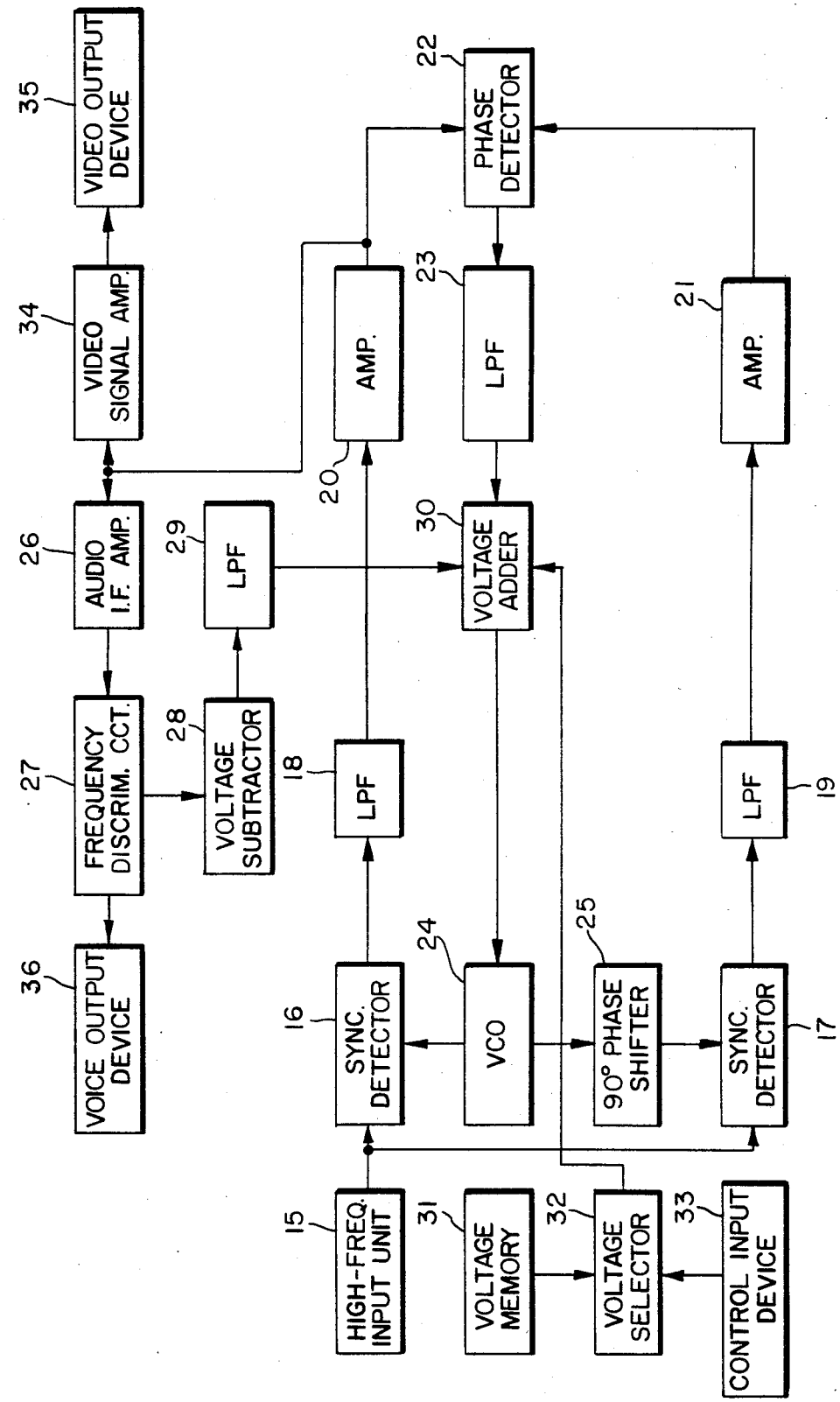
FIG. 2 is a block diagram of an embodiment of a synchronous television receiver.

Next, an embodiment of a television synchronous receiver of the invention will be detailed in accordance with the drawings. FIG. 2 is a block diagram of the embodiment of the invention, in which reference numeral 15 designates a high-frequency input unit; numeral 16 designates a first synchronous detector, 17 designates a second synchronous detector numerals 18 and 19 designate low-pass filters respectively. Numerals 20 and 21 designate signal amplifiers respectively; numeral 22 designates a phase detector, 23 designates a low-pass filter; numeral 24 designates a voltage-controlled oscillator; and numeral 25 designates a 90° phase shifter; elements 15–25 together constitute a Costas loop. Reference numeral 26 designates an audio intermediate frequency amplifier; numeral 27 designates a frequency discriminating circuit; numeral 28 designates a voltage subtractor, and numeral 29 designates a low-pass filter; elements 26–29 constitute a frequency pull-in circuit, whose output is added to the output of low-pass filter 23 in the Costas loop by the voltage adder 30. Reference numeral 31 designates a voltage memory; numeral 32 designates a voltage selector; and numeral 33 designates a control input device; elements 31-33 constitute a station-selection voltage generating circuit; the output voltage of voltage selector 32 is added to the output of low-pass filter 23 in the Costas loop. Reference numeral 34 designates a video signal amplifier; numeral 35 designates a video output device; and numeral 36 designates a voice output device.

Next, an explanation will be given on the operation of the embodiment of the television synchronous receiver constructed as abovementioned. At first, the operation of Costas loop system synchronous receiver for receiving the television signal will be explained. When a video carrier signal in a desired input channel input to the high-frequency unit 15 is represented by $v_v(t)$ and the audio carrier signal by $v_s(t)$ which is vestigial-side-band-modulated, is given in the following equation:

$$v_v(t) = Re\{[I(t) + jQ(t)]expj[\omega_v + \phi_v]\} \quad (1)$$
$$= I(t)cos[\omega_v t + \phi_v] - Q(t)sin[\omega_v t + \phi_v],$$

where Re is a real number term within the braces in the equation (1); I(t) is a signal of an in-phase conponent with respect to the carrier signal and including the video signal; Q(t) is a signal of a quadrature component with respect to the carrier signal; $\omega_v$ is an angular frequency, and $\phi_v$ is a phase of video carrier signal.

Assuming that the output of voltage-controlled oscillator 24 is given by:

$$v_o(t) = A_o \cos(\omega_o t + \phi_o) \quad (2),$$

and when the output $v_o(t)$ together with video carrier signal $v_v(t)$ is added to the first synchronous detector 16 comprising the voltage multiplier, the output $v_{pv}(t)$ is given as follows:

$$v_{pv}(t) = \{I(t)cos[\omega_v t + \phi_v] - Q(t)sin[\omega_v t + \phi_v]\}A_o cos(\omega_o t + \phi_o) \quad (3)$$

$$= A_o I(t)cos[\omega_v t + \phi_v]cos(\omega_o t + \phi_o) - A_o Q(t)sin[\omega_v t + \phi_v]cos(\omega_o t + \phi_o)$$

$$= \frac{A_o I(t)}{2}\{cos[(\omega_v + \omega_o)t + \phi_v + \phi_o] + cos[(\omega_v - \omega_o)t + \phi_v - \phi_o]\} -$$

$$\frac{A_o Q(t)}{2}\{sin[(\omega_v + \omega_o)t + \phi_v + \phi_o] + sin[(\omega_v - \omega_o)t + \phi_v - \phi_o]\}$$

Now, when the output of voltage-controlled oscillator 24 is synchronized with the video carrier, $\omega_o = \omega_v$ is given so that:

$$v_{pv}(t) = \frac{A_o I(t)}{2}\{cos[2\omega_v t + \phi_v + \phi_o] + cos[\phi_v - \phi_o]\} - \quad (4)$$

$$\frac{A_o Q(t)}{2}\{sin[2\omega_v t + \phi_v + \phi_o] + sin[\phi_v - \phi_o]\}$$

is obtained.

When the low-pass filter 23 eliminates the $2\omega_v$ signal, $$v_{pv}(t) = \frac{A_o I(t)}{2}cos\phi - \frac{A_o Q(t)}{2}sin\phi \quad (5)$$

is obtained, where $\phi$ is $\phi_v - \phi_o$: a phase difference between the video carrier and the output of voltage-controlled oscillator. If $\phi = 0$, $$v_{pv}(t) = \frac{A_o I(t)}{2} \quad (6)$$

follows. In other words, the signal of in-phase component with respect to the video carrier is obtained as the detected output. The quadrature component, however, has not been detected. The detected output $$\frac{A_o I(t)}{2},$$

as the video detected output, is amplified by the signal amplifier 20 via the low-pass filter 18 and then output to the video output device 35 via the video signal amplifier 34.

Figure 3:
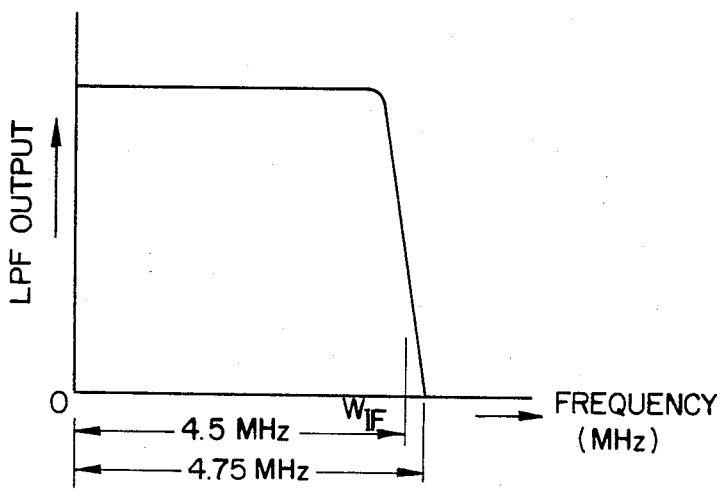
FIG. 3 shows the frequency characteristic of a low-pass filter for filtering an output of a synchronous detector.
Figure 4A:
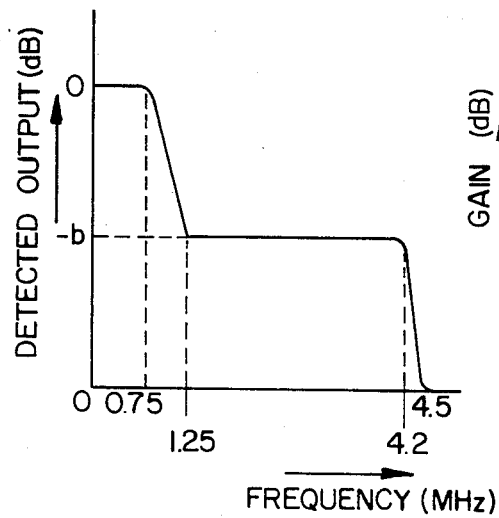
FIG. 4-(a) shows the base band frequency characteristic of a video signal.
Figure 4B:
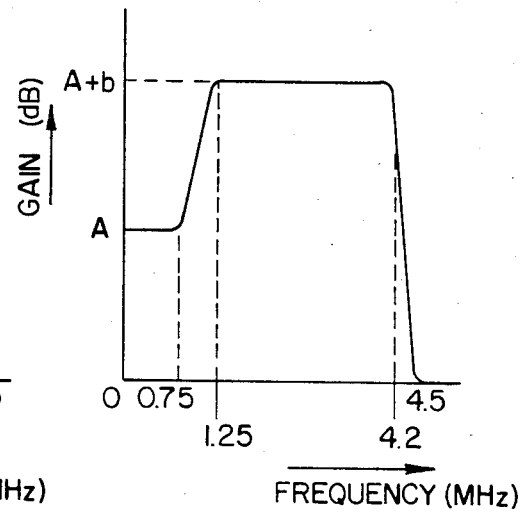

The filtering characteristic of the low-pass filter 18 is shown in FIG. 3, in which the video signal as shown is filtered in the baseband. When the conventional superheterodyne receiving system receives the television signal, the general baseband frequency characteristic can be assumed to be flat due to the Nyquist filtration characteristic of the intermediate-frequency amplifier of the receiver. The synchronous receiving system of the invention, however, should be assumed to be as shown in FIG. 4-(a). Namely, the voltage gain in the low band becomes twice as large as that in the high band, whereby the FIG. 2 embodiment compensates for the frequency characteristic as shown in FIG. 4-(b).

The audio carrier signal $v_s(t)$ in the television broadcasting signal, which is frequency-modulated, is expressed by:

$$v_s(t) = A_s \cos[\{\omega_s + s(t)\}t + \phi_s] \quad (7)$$

where $A_s$: amplitude of audio carrier signal, $\omega_s$: angular frequency of audio carrier signal, s(t): audio signal, and $\phi_s$: phase of audio carrier signal.

When $v_s(t)$ and $v_o(t)$ in equation (2) are input to the synchronous detector (16), the output therefrom is given by:

$$v_{ps}(t) = A_s \cos[\{\omega_s + s(t)\}t + \phi_s]A_o\cos(\omega_o t + \phi_o) \quad (8)$$

$$= \frac{A_s A_o}{2} \cos[(\omega_s + \omega_o)t + s(t)t + \phi_s + \phi_o] +$$

$$\frac{A_s A_o}{2} \cos[(\omega_s - \omega_o)t + s(t)t + \phi_s - \phi_o]$$

By eliminating the frequency component of $\omega_s + \omega_o$ by the low-pass filter (18), $$v_{ps}(t) = \frac{A_s A_o}{2} \cos[(\omega_s - \omega_o)t + s(t) + \phi_s - \phi_o] \quad (9)$$

is obtained.

By substituting $\omega_{1F} = \omega_s - \omega_o$ and $\omega_o = \omega_v$ into the equation (9), $$v_{ps}(t) = \frac{A_s A_o}{2} \cos[\{\omega_{1F} + s(t)\}t + \phi_s - \phi_o] \quad (10)$$

follows.

$v_{ps}(t)$ in equation (9) is nothing but the audio carrier signal in equation (7) converted into the audio intermediate frequency signal of angular frequency of $\omega_{1F}$.

The filtering characteristic of the low-pass filter 18, as shown in FIG. 3, is adapted to cover the frequency $\omega_{1F}$ of audio intermediate frequency signal, the audio intermediate signal being amplified by the signal amplifier 20 and audio intermediate frequency amplifier 26 via the low-pass filter 18, the output of amplifier 26 being demodulated, thereby obtaining a voice signal s(t) which is supplied to the voice output device 36.

The abovementioned system shows no difference between the phase of video carrier signal $v_v(t)$ and that of synchronous signal $v_o(t)$ of output of voltage-controlled oscillator 24, in other words, $\phi = 0$, which is obtained as follows:

Since the output $v_Q(t)$ of 90° phase shifter has a phase difference of 90° from the output of voltage-controlled oscillator 24, the following equation is given:

$$v_Q(t) = A_o \sin(\omega_o t + \omega_o) \quad (11)$$

When the $v_o(t)$ together with $v_v(t)$ in equation (1) is added to the second synchronous detector 17 comprising the voltage multiplier, its output $v_{pQ}(t)$ is given as follows:

$$v_{pQ}(t) = \{I(t)\cos[\omega_v t + \phi_v] - Q(t)\sin[\omega_v t + \phi_v]\}A_o\sin(\omega_o t + \phi_o) \quad (12)$$

$$= A_o I(t)\cos[\omega_v + \phi_v]\sin(\omega_o t + \phi_o) -$$

$$A_o Q(t)\sin[\omega_v + \phi_v]\sin(\omega_o t + \phi_o)$$

$$= \frac{A_o I(t)}{2}\{\sin[(\omega_v + \omega_o)t + \phi_v + \phi_o) -$$

$$\sin[(\omega_v - \omega_o)t + \phi_v - \phi_o]\} -$$

$$\frac{A_o Q(t)}{2}\{-\cos[(\omega_v + \omega_o)t + \phi_v + \phi_o] +$$

$$\cos[(\omega_v - \omega_o)t + \phi_v - \phi_o]\}$$

By use of $\omega_o = \omega_v$, $$v_{pQ}(t) = \frac{A_o I(t)}{2}\{\sin[2\omega_v t + \phi_v + \phi_o] - \sin[\phi_v + \phi_o]\} \quad (13)$$

$$\frac{A_o Q(t)}{2}\{-\cos[2\omega_v t + \phi_v + \phi_o] + \cos[\phi_v - \phi_v]\}$$

follows.

When $2\omega_v$ signal is eliminated by the low-pass filter 19, $$v_{pQ}(t) = -\frac{A_o I(t)}{2}\sin\phi - \frac{A_o Q(t)}{2}\cos\phi \quad (14)$$

signal is obtained. The $v_{pQ}(t)$ is amplified by the signal amplifier 21 and added to the phase detector 22.

The phase detector 22 comprising the voltage multiplier voltage-multiplies $v_{pv}(t)$ by $v_{pQ}(t)$ to result in the generation of control voltage $v_c(t)$ as follows:

$$v_c(t) = v_{pv}(t) \cdot v_{pQ}(t) \quad (15)$$

$$= \left\{\frac{A_o I(t)}{2}\cos\phi - \frac{A_o Q(t)}{2}\sin\phi\right\}$$

$$\left\{-\frac{A_o I(t)}{2}\sin\phi - \frac{A_o Q(t)}{2}\cos\phi\right\}$$

$$= -\frac{A_o^2}{8}\{I(t)^2 - Q(t)^2\}\theta \frac{A_o^2}{4}\{I(t)Q(t)\},$$

where $\theta - 2v$ and the amplification factors of the first and second signal amplifiers are made equal to 1.

Since the video carrier signal $v_v(t)$ has a vestigial-sideband characteristic, the in-phase component I(t) is always larger than the quadrature component Q(t). Therefore, the following inequality should hold:

$$\frac{A_o^2}{8}\{I(t)^2 - Q(t)^2\} \neq 0$$

At this time, if the loop bandwidth is restricted enough to eliminate the second term component in equation (15), the voltage-controlled oscillator 24 is controlled so as to be $\theta = 0$. In other words, the phase error 4 between the video carrier signal $v_v(t)$ and the output $v_o(t)$ of voltage-controlled oscillator 24 is put in a condition of $\phi = 0$.

Next, an explanation will be given on the operation of the frequency pull-in circuit. It has previously been described that the synchronous detector 16 obtains the audio intermediate frequency signal $v_{ps}(t)$ and that the $v_{ps}(t)$ is demodulated into the voice signal s(t) by the frequency discriminator 27 via the low-pass filter 18, signal amplifier 20 and audio intermediate frequency amplifier 26. The frequency pull-in circuit serves to utilize the frequency discriminating output obtained from the frequency discriminator 27 to pull in the frequency of Costas loop, thereby reducing its pull-in time.

The audio intermediate frequency signal $v_{ps}'(t)$ added to the frequency discriminator 27, when the amplitude of the equation 9 is put to a constant value $A_s'$ and the sum of intermediate frequency angular frequency $\omega_{1F}$ and error frequency $\Delta\omega$ is represented by $\omega_s - \omega_o$ so that the differentiated value is included in $\Delta\omega$, and can be expressed by the following equation:

$$v_{ps}'(t) = A_s' \cos[\omega_{1F} + \Delta\omega + s(t)]t \quad (16),$$

where $\omega_{1F} = \omega_s - \omega_v$.

Figure 5A:
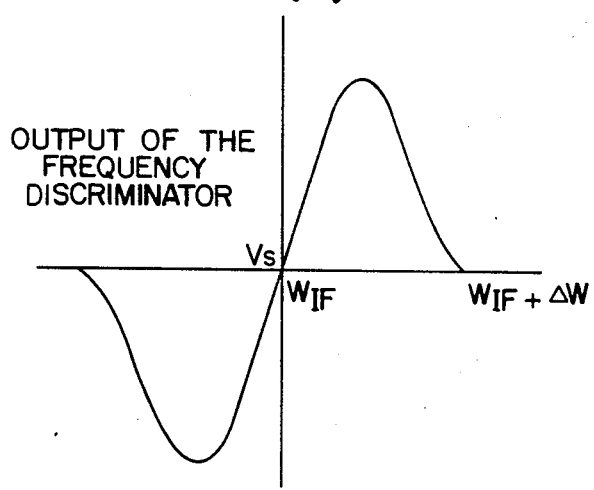
FIG. 5-(a) shows an output characteristic of a frequency discriminator.
Figure 5B:
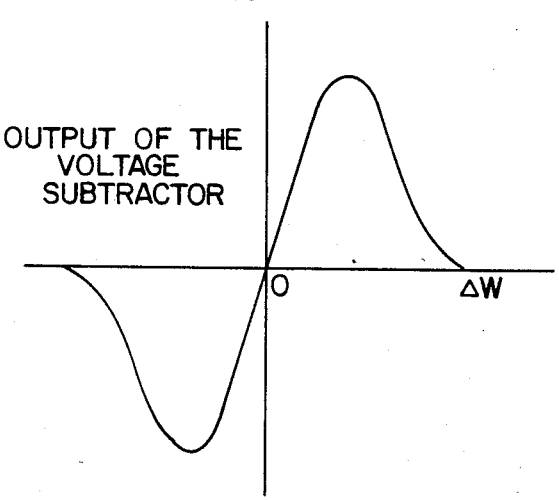

Since the average value of audio signal $s(t)$ is 0, the average value of instantaneous angular frequency of the audio intermediate frequency signal $v_{ps}'(t)$ is $\omega_{1F} + \Delta\omega$. The output of frequency discriminator 27 corresponding to the average value frequency is shown in FIG. 5-(a), where voltage $V_s$ is the output of frequency discriminator corresponding to the angular frequency $\omega_{1F}$. The voltage subtracter 28, when the carried angular frequency of the audio intermediate frequency signal is $\omega_{1F}$, subtracts the voltage $V_s$ from the output of discriminator 27 so that the output voltage of subtracter 28 becomes equal to zero volts, the output of voltage subtracter at this time being shown in FIG. 5-(b).

In case that the cutoff frequency of the low-pass filter 29 is determined to be low enough to eliminate the $s(t)$ component, the low-pass filter 29 can output an output voltage corresponding to the polarity and magnitude of error frequency $\Delta\omega$, the output voltage being added to the voltage-controlled oscillator 24 via the voltage adder 30.

Next, an explanation will be given on the operation of the embodiment of television receiver of the invention which selects a desired receiving channel to be put in the receiving state. The voltage selector 32 selects a station-selection voltage which is stored in the voltage memory 31 and which corresponds to the desired receiving channel output from the control input device 33, so that the selected voltage is input to the voltage adder 30 and controls the voltage-controlled oscillator 24 to generate the synchronous carrier signal $v_o(t)$. The audio carrier signal $v_s(t)$ and synchronous carrier signal $v_o(t)$ are added to the synchronous detector 16, resulting in the audio intermediate frequency signal $v_{ps}(t)$ being generated. The frequency pull-in circuit controls the frequency of the synchronous carrier signal $v_o(t)$ so that the frequency of the audio intermediate frequency signal $v_{ps}(t)$ is equal to a difference, i.e., $\omega_{1F}$, between the carrier frequency $\omega_v$ of the broadcast video carrier signal $\omega_v(t)$ and the carrier frequency $\omega_s$ of the audio carrier signal $v_s(t)$. The Costas loop, when the controlled frequency enters in a frequency pull-in range of the Costas loop, is quickly put into a phase locked condition. Upon the phase locking of the Costas loop, the video signal $v_{pv}(t)$ and the audio intermediate frequency signal $v_{ps}(t)$ are obtained from the synchronous detector 16. These signals pass through the low-pass filter 18 and the like, the video signal being output to the video output device 35, and the audio intermediate frequency signal being demodulated by the frequency discriminator 27 so that its demodulated signal: voice signal, is output to the voice output device 36.

FIG. 6 is a block diagram of the principal portion of a modified embodiment of the synchronous television receiver of the invention, in which reference numeral 37 designates high-frequency input unit; numeral 38 designates a first synchronous detector; numeral 39 designates a second synchronous detector; numerals 40 and 41 designate low-pass filters; numerals 42 and 43 designate signal amplifiers; numeral 44 designates a first phase detector; numeral 45 designates a first low-pass filter; numeral 46 designates a voltage-controlled oscillator; and numeral 47 designates a 90° phase shifter; elements 37–47 constitute a Costas loop. Reference numeral 48 designates an audio intermediate frequency amplifier; numeral 49 designates a frequency discriminator; numeral 50 designates a voltage subtracter; and numeral 51 designates a second low-pass filter; elements 48–51 constitute a frequency pull-in circuit, an output of which is added by the voltage adder 52 to the output of the first low-pass filter 45. Reference numeral 53 designates a reference oscillator; numeral 54 designates a reference frequency divider; numeral 55 designates a prescaler; numeral 56 designates a variable frequency divider; numeral 57 designates a second phase detector; and numeral 58 designates a switching circuit; components 53–58 together with the first low-pass filter 45 and voltage-controlled oscillator 46 constituting a PLL, and constituting, together with the PLL and a station-selection control circuit 59 and the control signal input device, a synthesized system station-selection device. In addition, reference numeral 61 designates a video signal amplifier; numeral 62 designates a video output device; and numeral 63 designates a voice output device.

In the modified embodiment of the invention, the Costas loop and frequency pull-in circuit operate in the same fashion as those in the first embodiment of the present invention. Hence, an explanation will only be given on the operation of the PLL frequency synthesizer and also on the operation of the modified embodiment, which operation selects the desired receiving channel and puts the receiver in the receiving state.

The output of the voltage-controlled oscillator 46 is divided in frequency the prescaler 55 and variable frequency divider 56 and then added to one terminal of the second phase detector 57 and the reference signal generated by the reference oscillator 53 is input to the other terminal of the phase detector 57 through the reference frequency divider 54, the output of phase detector 57 controlling the voltage-controlled oscillator 64 via the switching circuit 58 and first low-pass filter 45. A dividing ratio is output from the station-selection circuit 59 to the variable frequency divider 56 corresponding to the desired receiving channel output from the control signal input device 60, so that the oscillation frequency of the voltage-controlled oscillator 46 is controlled according to the dividing ratio.

The output of voltage-controlled oscillator 46 corresponds to the synchronous carrier $v_o(t)$. The synchronous carrier $v_o(t)$ and audio carrier signal $v_s(t)$ are input to the synchronous detector 28, resulting in the generation of an audio intermediate frequency signal $v_{ps}(t)$. Upon turning the frequency synthesizer PLL so as to be open loop, the frequency pull-in circuit controls the frequency of the synchronous carrier $v_o(t)$ so that the frequency of the audio intermediate frequency signal $v_{ps}(t)$ is equal to a difference, i.e., $\omega_{1F}$, between the broadcast frequency $\omega_v$ of broadcast video carrier signal $\omega_v(t)$ and the carrier frequency $\omega_s$ of audio carrier signal $\omega_s(t)$. When the frequency enters in a frequency pull-in range of the Costas loop, the Costas loop is rapidly put into its phase locked condition. Upon putting the Costas loop into its phase locked condition video signal $v_{pv}(t)$ and the audio intermediate frequency signal $v_{ps}(t)$ are obtained by the synchronous detector 28. These signals pass through the low-pass filter 40, the video signal being output to the video output device 62; the audio intermediate frequency signal is demodulated by the frequency discriminator 49, so that the demodulated signal thereof is output to the voice output device 63.

The foregoing disclosure is for the purpose of disclosing specific preferred embodiments and the scope of this invention is of course not limited to this specific construction but as defined in the following claims.

What is claimed is:

1. A television synchronous receiver comprising: a voltage-controlled oscillator; a 90° phase shifter which shifts by 90° the phase of an output of said voltage-controlled oscillator; first and second synchronous detectors which detect an in-phase component and quadrature component of a video carrier signal which is output from an input unit of said receiver by two synchronous carriers comprising an output of said voltage-controlled oscillator and an output of said 90° phase shifter; a phase detector which is operatively connected to said first and second synchronous detectors and which detects a phase difference between the said video carrier signal and the output of said voltage-controlled oscillator; a first low-pass filter for low-pass filtering the output of said phase detector; a frequency discriminator which discriminates the frequency of an audio intermediate frequency signal generated by said first synchronous detector; and a second low-pass filter which low-pass filters an output of said frequency discriminator, wherein the output of said second low-pass filter together with the output of said first low-pass filter which low-pass filters the output of said phase detector are adapted to be fed back to said voltage-controlled oscillator.

2. A television synchronous receiver according to claim 1, further comprising a station-selection voltage generating circuit which generates a station-selection voltage which is input to said voltage-controlled oscillator.

3. A television synchronous receiver according to claim 2, wherein said station-selection voltage generating circuit comprises a voltage memory, a voltage selector for selecting the memory content stored in said voltage memory, and a control input device for controlling said voltage selector.

4. A television synchronous receiver according to claim 2, wherein said station-selection voltage generating circuit comprises: a reference oscillator; a reference frequency divider which frequency-divides an output of said reference oscillator; a variable frequency divider which divides an output of said voltage-controlled oscillator; another phase detector which compares in phase the output of said reference frequency divider with the output of said variable frequency divider; and a switching circuit which switches the output of said another phase detector and the output of said phase detector so that said switched output is input to said voltage-controlled oscillator.

* * * * *